(No Model.)

F. VAN BENTHUYSEN.
ROLLER BEARING.

No. 479,038. Patented July 19, 1892.

WITNESSES:
S. B. Brewer
E. T. Chapman Jr.

INVENTOR:
Frank Van Benthuysen,
BY William H. Low,
ATTORNEY.

United States Patent Office.

FRANK VAN BENTHUYSEN, OF ALBANY, NEW YORK.

ROLLER-BEARING.

SPECIFICATION forming part of Letters Patent No. 479,038, dated July 19, 1892.

Application filed September 19, 1891. Serial No. 406,187. (No model.)

*To all whom it may concern:*

Be it known that I, FRANK VAN BENTHUYSEN, of the city and county of Albany, in the State of New York, have invented new and useful Improvements in Roller-Bearings, of which the following is a specification.

My invention relates to improvements in roller-bearings for shafts and other revolving parts of machines, but more especially to that class of said bearings which are designed for use on bicycles and other forms of velocipedes; and the object of my invention is to provide a journal-bearing that will be approximately frictionless and will practically prevent the admission of dust and grit thereto. This object I attain by the mechanism illustrated in the accompanying drawings, which, being herein referred to, form part of this specification, and in which—

Figures 1, 2:
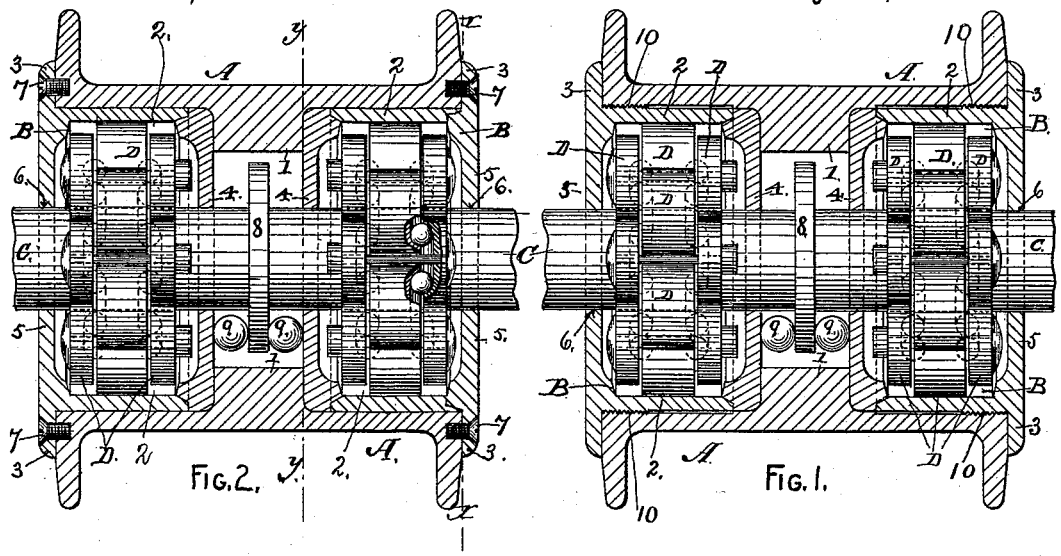
Figures 3, 4:
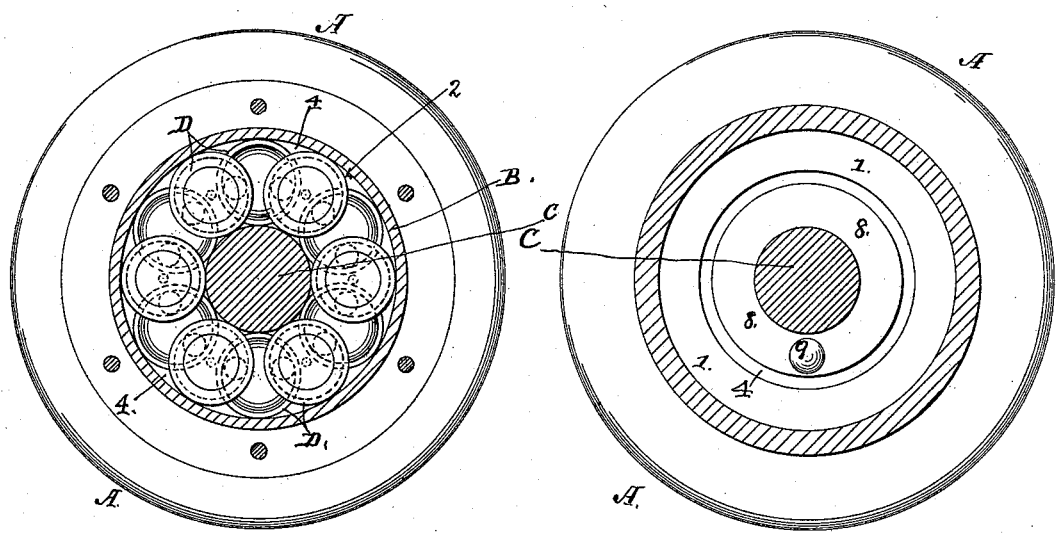
Figure 5:
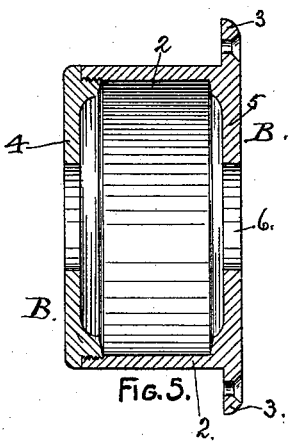

Figure 1 is a longitudinal section of one form of my invention as applied to the hub of a bicycle-wheel, the rollers of my roller-bearing and the shaft on which said bearing runs being shown in elevation. Fig. 2 is a like section showing a modified form of securing the cage in the hub of the wheel. Fig. 3 is a transverse section of Fig. 2 at the irregular line X X. Fig. 4 is a transverse section of Fig. 2 at the line Y Y, and Fig. 5 is a longitudinal section of a modified form of the cage for containing the rollers of my roller-bearing.

As represented in the drawings, A designates a hub of a bicycle-wheel made in tubular form and having at the middle of its bore an internal circumferential rib 1. The opposite ends of said hub are open, and the bore from the rib 1 outwardly to each end of the hub forms recesses for containing the cages for the roller-bearings.

The cages B consist of a body-piece 2 and an annular end piece 4. The body-piece 2 is made in the form of a hollow cylinder, which is fitted snugly into the bore of the hub A and is provided with a circumferential flange 3, which overlaps on the face of said hub, and with a head 5, having a central opening 6, through which the shaft of the bicycle protrudes. The end piece 4 is preferably provided with an annular groove at its outer edge for receiving the inner end of the body-piece on a coniform seat, as shown in Fig. 1; but said body-piece and annulus may be made to screw together, as shown in Fig. 5. Contained in each cage B there is a roller-bearing D, which is fitted to fill the annular space between the bore of the body-piece 2 and the periphery of the shaft C.

The roller-bearing D (shown in Figs. 1, 2, and 3) forms no part of my present invention, the same being shown and described in Letters Patent of the United States, No. 459,774, granted to me therefor and bearing date September 22, 1891; but, when preferred, any other form of roller-bearing may be substituted therefor.

The cages B are retained in the hub A, so as to have their inner ends bear against the rib 1 either by means of screws 7, as shown in Fig. 2, or by means of corresponding screw-threads 10, formed on the body-piece 2 and in the bore of the hub A, as shown in Fig. 1.

C designates a bicycle-shaft, which is provided with a circumferential flange 8, which is located in the space formed by the reduced bore of the hub A to produce the rib 1. Said flange comes between the adjacent inner ends of the cages B, and between the latter and said flange balls 9 are interposed to form an anti-friction bearing for resisting any endwise thrust that said shaft may be subjected to or to receive any pressure resulting from a tendency of the hub A to move endwise on said shaft.

When the cage B is made in the form shown in Fig. 5, said cage and the roller-bearing contained therein can be removed from the hub A and replaced therein without separating said bearing from the cage.

What I claim as my invention, and desire to secure by Letters Patent, is—

1. The combination of a shaft provided with a circumferential flange which separates the journal into two parts, a wheel-hub having at each end a recess for containing a roller-bearing, said recesses being separated by an internal circumferential flange or rib and each of said roller-bearings being contained in a cage that is removable from said hub, and anti-friction balls or rollers interposed between the inner end of said cages and the flange of said shaft, as and for the purpose herein specified.

2. The combination of a hub A, having an open-ended chamber, an annular end piece 4, having at the periphery of its outer face an annular groove, said end piece being fitted to bear against the inner end of said chamber, a cage B, consisting of a body-piece 2 and the end piece 4, said body-piece having its inner end fitted to engage in the annular groove of said end piece and its outer end provided with a circumferential flange which overlaps onto the outer face of said hub, and a roller-bearing D, contained in said cage and fitted to revolve therein, as and for the purpose herein specified.

FRANK VAN BENTHUYSEN.

Witnesses:
 WM. H. LOW,
 S. B. BREWER.